United States Patent [19]

Kawamura

[11] Patent Number: 4,882,905
[45] Date of Patent: Nov. 28, 1989

[54] DEVICE FOR CONTROLLING TURBOCHARGER WITH ELECTRIC ROTARY MACHINE

[75] Inventor: Hideo Kawamura, Samukawa, Japan
[73] Assignee: Isuzu Motors Limited, Tokyo, Japan
[21] Appl. No.: 225,255
[22] Filed: Jul. 28, 1988

[30] Foreign Application Priority Data

Jul. 29, 1987 [JP] Japan .................. 62-189740

[51] Int. Cl.⁴ .............................................. F02B 37/00
[52] U.S. Cl. ......................................... 60/608; 290/52
[58] Field of Search ..................... 60/607, 608; 290/52

[56] References Cited

U.S. PATENT DOCUMENTS

| | | | |
|---|---|---|---|
| 4,745,755 | 5/1988 | Kawamura | 60/608 |
| 4,757,686 | 7/1988 | Kawamura et al. | 60/608 |

FOREIGN PATENT DOCUMENTS

| | | | |
|---|---|---|---|
| 3539782 | 5/1987 | Fed. Rep. of Germany | 60/608 |
| 195330 | 10/1985 | Japan | 60/608 |
| 212622 | 10/1985 | Japan | 60/608 |

*Primary Examiner*—Michael Koczo
*Attorney, Agent, or Firm*—Staas & Halsey

[57] ABSTRACT

A device for controlling a turbocharger with an electric rotary machine detects, at all times, the rotational speed of the engine on a motor vehicle and the amount of depression of the accelerator pedal while the motor vehicle is running, to confirm present running conditions of the motor vehicle. A required boost pressure which is required under the confirmed running conditions is determined, and if the required boost pressure is higher than the boost pressure produced from the turbocharger by the energy of exhaust gases emitted from the engine and corresponding to the rotational speed of the engine, the controlling device drives the electric rotary machine coupled to the rotatable shaft of the turbocharger as a motor to increase the speed of rotation of the turbocharger for a quick buildup of the boost pressure.

5 Claims, 4 Drawing Sheets

DEVICE FOR CONTROLLING TURBOCHARGER WITH ELECTRIC ROTARY MACHINE

BACKGROUND OF THE INVENTION

The present invention relates to a device for controlling a turbocharger having a rotatable shaft on which a motor/generator electric rotary machine is mounted.

There have been proposed various systems in which a turbocharger is mounted on the exhaust pipe of an internal combustion engine on a motor vehicle and has a rotatable shaft to which a motor/generator is directly coupled for the recovery of the energy of exhaust gases.

Japanese Patent Application No. 60-188827 discloses, as one such system, a device for controlling a turbocharger associated with an internal combustion engine to operate the motor/generator selectively as a generator or a motor dependent on the rotational speed of the engine and the load on the engine.

In the proposed device disclosed in the above application, when the motor/generator operates as a generator, an electric load or a battery is supplied with generated electric power, and when the motor/generator operates as a motor, the supercharging operation of the turbocharger is assisted to increase the output power of the engine. The earlier controlling device however does not have a means for optimizing the boost pressure of the turbocharger according to changes in the running conditions of the motor vehicle. Therefore, even when the motor vehicle is running under conditions which require quick acceleration, the turbocharger tends to suffer an insufficient boost pressure, and desired acceleration cannot be achieved.

SUMMARY OF THE INVENTION

It is an object of the present invention to provide a device for controlling a turbocharger with an electric rotary machine to obtain an optimum boost pressure, with a good response, according to the depth to which an accelerator pedal is depressed, which indicates the driver's intention, for thereby improving the acceleration capability of the motor vehicle that is equipped with the turbocharger.

According to the present invention, there is provided a device for controlling a turbocharger with an electric rotary machine, including a turbine mounted on an engine on a motor vehicle and drivable by exhaust gases emitted from the engine; a rotatable shaft coupled to the turbine; a compressor coupled to the rotatable shaft for delivering air under pressure to the engine; an electric rotary machine coupled to the rotatable shaft; an engine speed sensor for detecting the rotational speed of the engine; an accelerator pedal movement sensor for detecting the amount of depression of an accelerator pedal which controls operation of the engine; a boost pressure sensor for detecting the pressure of air supplied to the engine; a turbine speed sensor for detecting the rotational speed of the turbine; a battery mounted on the motor vehicle; means for calculating a required boost pressure based on signals from the engine speed sensor and the accelerator pedal movement sensor; means for comparing the required boost pressure and a boost pressure generated from the turbocharger by the energy of exhaust gases emitted from the engine and corresponding to the rotational speed of the engine; and means for driving the electric rotary machine as a motor and supplying the electric rotary machine with electric power from the battery which corresponds to the difference between the required boost pressure and the boost pressure generated by the turbocharger if the required boost pressure is higher than the boost pressure generated by the turbocharger.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

Figure 1:
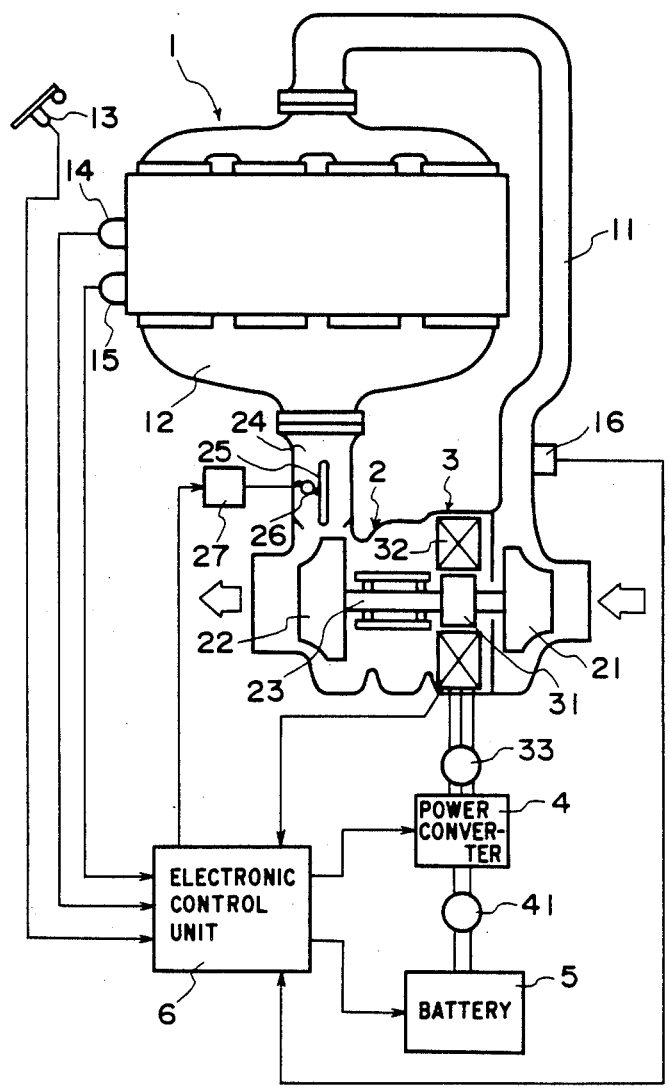
FIG. 1 is a block diagram of a device for controlling a turbocharger with an electric rotary machine according to the present invention.

FIG. 1 shows in block form a device for controlling a turbocharger with an electric rotary machine according to the present invention. FIG. 1 illustrates an internal combustion engine 1 which is operated by the energy produced by combusting supplied fuel with air drawn through an intake pipe 11 for driving a motor vehicle (not shown). Exhaust gases emitted from the engine 1 by fuel combustion are discharged through an exhaust pipe 12. Denoted at 13 is an accelerator pedal movement sensor for detecting the amount of depression of an accelerator pedal, 14 a load sensor for detecting the load on the engine 1 based on the position of a rack of a fuel injection pump (not shown) of the engine 1, and 15 an engine speed sensor for detecting the rotational speed of the engine 1. These sensors transmit detected signals to an electronic control unit (described later on).

A turbocharger 2 is coupled to the exhaust pipe 12 and the intake pipe 11. The turbocharger 2 has a turbine 22 drivable by exhaust gases and a compressor 21 for delivering intake air into the intake pipe 11. The turbine 22 and the compressor 21 are interconnected by a rotatable shaft 23 on which there is mounted an electric rotary machine 3 that is operable selectively as a motor or a generator. The turbocharger 2 has an exhaust gas inlet pipe 24 coupled to the exhaust pipe 12 and housing a partition 25 which is disposed in an exhaust passage for driving the turbine 22 to divide the exhaust passage into two passageways. An on/off valve 26 is disposed in one of the divided passageways. When the amount of emitted exhaust gases is small, the on/off valve 26 is closed to increase the speed of flow of exhaust gases through the other passageway for driving the turbine 22 at high speed.

The electric rotary machine 3 has a rotor 31 which can be rotated by electric power supplied form a battery 5 through a power converter 4. When the rotor 31 is rotated, the compressor 21 operates to compress intake air and supercharge the engine 1 through the intake pipe 11. The boost pressure developed by the compressor 21 is detected by a boost pressure sensor 16 which transmits its detected signal to an electronic control unit 6.

The power converter 4 has power control circuits such as a rectifying/smoothing circuit for converting AC electric power into DC electric power, a converter circuit for converting the voltage of the DC electric power into AC electric power with its frequency freely regulatable, and a duty factor control circuit for controlling the voltage of electric power with semiconductor control elements. The power converter 4 is electrically connected between the electric rotary machine 3 and the battery 5. The various power control circuits of the power converter 4 are controlled by commands from the electronic control unit 6.

The AC electric power from the electric rotary machine 3 operating as a generator is converted into DC electric power by the rectifying/smoothing circuit of the power converter 4, and the DC electric power is controlled by the converter circuit and the duty factor control circuit so as to be suitable for charging the battery 5. When the electric rotary machine 3 operates as a motor, the DC electric power from the battery 5 is converted by the converter and inverter circuits of the power converter 4 into AC electric power of a prescribed frequency and voltage which is supplied to a stator 32 of the electric rotary machine 3 for assisting the supercharging operation of the turbocharger that is driven by the exhaust gases.

Designated in FIG. 1 at 33 is an AC voltmeter for detecting the voltage across the stator 32 of the electric rotary machine 3, and 41 a DC voltmeter for detecting the DC terminal voltage of the power converter 4. Detected signals from these voltmeters 33, 41 are sent to the electronic control unit 6.

The electronic control circuit 6 includes a microcomputer having a central processing unit supplied with signals from the various sensors, referred to above, indicating operating conditions of the engine 1 and signals from the voltmeters for effecting arithmetic operations and counting control occurrences or cycles, various memories for storing a map of data indicating the relationship between engine operating conditions and required boost pressures and a program for controlling operation of the electric rotary machine, and an input/output device for receiving various input signals and issuing control commands to an actuator 27 and the power converter.

Figure 2:
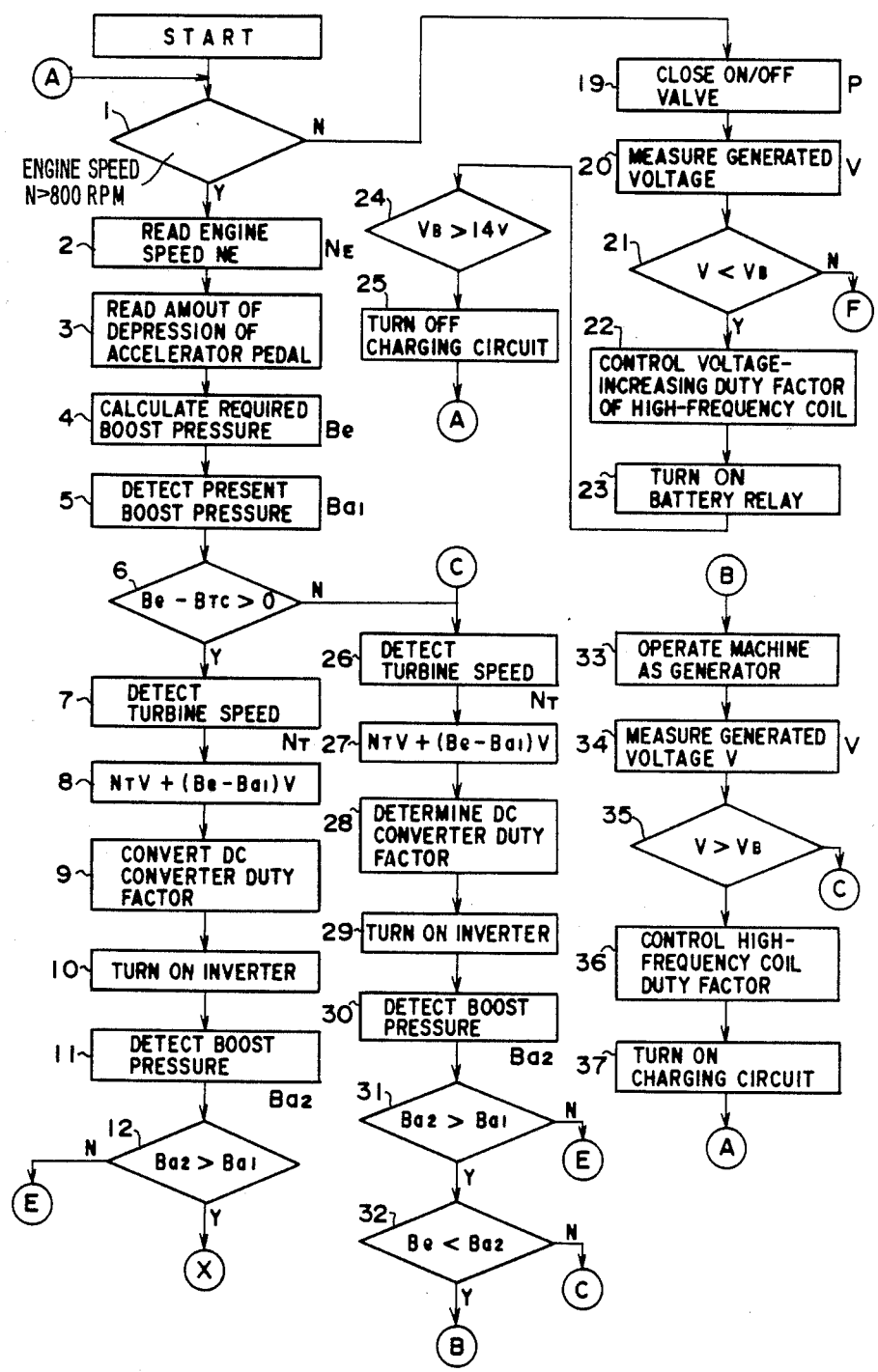
FIGS. 2(A) and 2(B) from are a flowchart of operation of the controlling device of the present invention.
Figure 2:
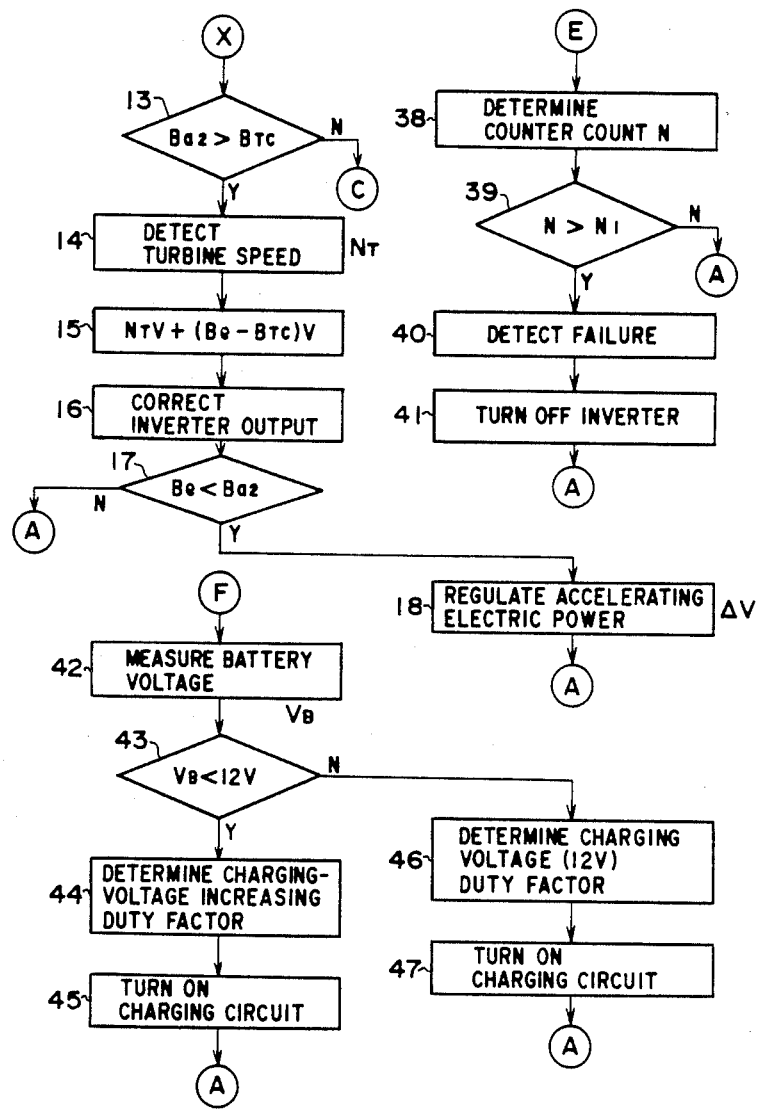

FIGS. 2(A) and 2(B) from flowchart of an operation sequence of the controlling device of the present invention. Now, operation of the controlling device will be described below with reference to FIGS. 2(A) and 2(B).

A step 1 checks the rotational speed of the engine 1 based on a signal from the speed sensor 15. If the rotational speed is higher than 800 RPM, for example, then control goes to a step 2 in which the engine rotational speed NE is read. A step 3 then reads in the amount of the depression of the accelerator pedal based on a signal from the accelerator pedal movement sensor 13. Thereafter, a required boost pressure Be which is required to meet the running conditions indicated by the engine rotational speed and the engine rotational speed NE read in the steps 1 and 2 is calculated in a step 4 from the engine rotational speed and the boost pressure. A step 5 detects the present boost pressure $Ba_1$ from a signal from the boost pressure sensor 16.

Figure 3:
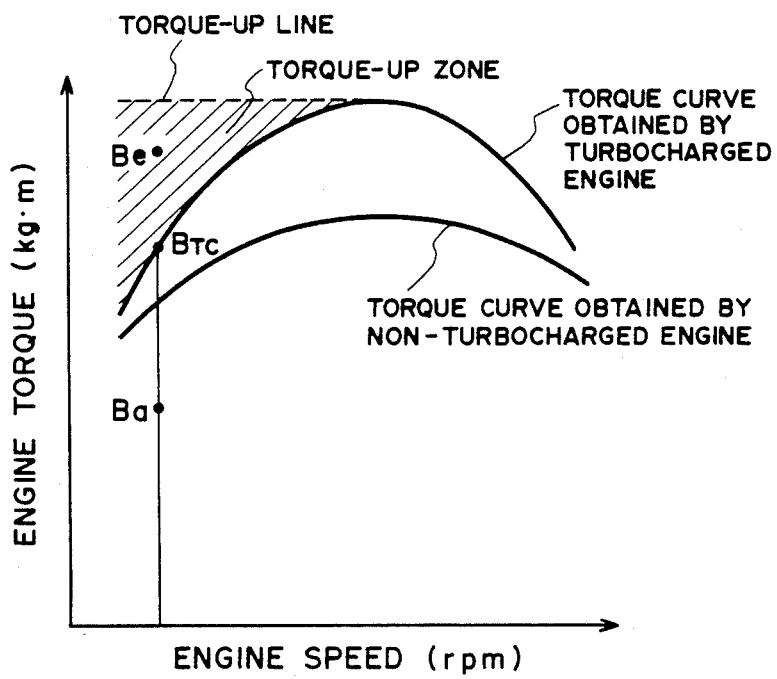
FIG. 3 is a graph showing the relationship the between rotational speed of an engine and the torque produced thereby.

Then, a step 6 detects whether the difference (Be−BTC) produced by subtracting the boost pressure BTC generated only by exhaust gases emitted from the engine from the required boost pressure Be is positive or negative. More specifically, the step 6 determines whether the required boost pressure Be is in a torque-up zone as shown in FIG. 3 or not. If (Be−BTC)>0, i.e., the required boost pressure Be is in excess of BTC and in the torque-up zone, then the present boost pressure $Ba_1$ is quickly increased up to the required boost pressure Be in steps 7 through 18.

A step 7 detects the rotational speed NT of the turbine from the AC frequency of the electric rotary machine 3. A step 8 calculates the sum of electric power NT·V produced at the turbine speed NT and electric power (Be−$Ba_1$)·V corresponding to the boost pressure (Be−$Ba_1$). The compressor 21 is driven by the sum electric power thus obtained thereby to achieve the required boost pressure Be. More specifically, after the electric power to be supplied to the electric rotary machine 3 has been calculated, the electric power from the battery 5 is controlled through duty factor control and supplied by the converter and the inverter circuits of the power converter 4 as the electric power (Be·$Ba_1$)·V of a prescribed frequency to the electric rotary machine 3 (steps 9 and 10) for assisting the rotation of the compressor 21 to increase the boost pressure. Then, the increased boost pressure $Ba_2$ is detected from a signal from the boost pressure sensor 16 in a step 11.

A step 12 compares the increased boost pressure $Ba_2$ with the boost pressure $Ba_1$ before it is increased. If $Ba_2$>$Ba_1$ due to acceleration which has taken place, then a step 13 compares the boost pressure $Ba_2$ and the boost pressure BTC which is generated by the turbocharger only by the pressure of exhaust gases from the engine. If $Ba_2$>BTC, then an assisting process in steps 14 through 16 is effected (If $Ba_2$<BTC, then a different process is carried out as described later on).

That is, if $Ba_2$>BTC, then the turbine rotational speed NT is detected from the AC frequency of the electric rotary machine 3 in a step 14. Then, the electric power NT·V at the turbine rotational speed NT and the voltage NT·V+(Be−BTC) corresponding to the boost pressure (Be−BTC) are added together in a step 15, which is followed by a step 16 in which the electric power from the battery 5 is corrected to drive the electric rotary machine 3 to cause the boost pressure to reach Be in order that the electric power becomes NT·V+(Be−BTC)·V.

Thereafter, the required boost pressure Be and the increased boost pressure $Ba_2$ are compared in a step 17. If Be<$Ba_2$, then since the boost pressure has been increased in excess of the required pressure Be, voltage regulation or frequency control is effected to lower the voltage by ΔV until the boost pressure drops to the desired level Be in a step 18.

If Be<BTC, i.e., the required boost pressure Be is lower than the boost pressure BTC developed by the turbocharger in the step 6, then control goes to a step 26 in which the turbine rotational speed NT is detected from the AC frequency of the electric rotary machine 3. The boost pressure Be is obtained by actuating the compressor 21 with the electric energy equal to the sum of the electric power NT·V based on the turbine speed NT and the electric power (Be−$Ba_1$) V corresponding to the boost pressure (Be−$Ba_1$) Thereafter, the boost pressure is increased, and the increased boost pressure $Ba_2$ is checked by the boost sensor 16 in steps 27 through 30 (which are the same as the steps 8, 9, 10, 11). A step 31 compares the boost pressures $Ba_2$ and $Ba_1$. If the boost pressure $Ba_2$ is higher than the boost pressure $Ba_1$, the required boost pressure Be is compared with the boost pressure $Ba_2$ after the electric rotary machine has been driven. If the boost pressure $Ba_2$ is higher, then it means that the boost pressure under the present engine speed is enough, i.e., it is not necessary to increase the boost pressure, and hence the electric rotary machine 3 is operated as a generator in a step 33 to charge the battery with excessive electric power. Then, the generated electric power V is measured in a step 34, and the generated electric power is compared with a battery voltage VB in a step 35. If $V > VB$, then the duty factor of a high-frequency coil is controlled in a step 36, and a battery charging circuit is turned on in a step 37 to charge the battery. If $V < VB$, then control returns to the step 26 to repeat the steps 26 through 35. When $V > VB$, the battery can be charged, and control goes to the steps 36, 37.

If $Ba_2 < BTC$ in the step 13, control also goes to the step 26 to repeat the steps 26 through 37 for charging the battery.

If the engine rotational speed N is lower than 800 RPM in the step 1, the control jumps to a step 19 in which the actuator 27 is operated to close the on/off valve 26 to increase the speed of flow of exhaust gases for increase the speed of rotation of the turbocharger.

In a next step 20, the voltage V generated by the electric rotary machine 3 at this time is measured. Then the voltage V and the battery voltage VB are compared in a step 21. If $V < VB$, then the duty factor for increasing the voltage across the high-frequency coil of the power converter 4 is determined to increase the generated voltage v higher than the battery voltage VB in a step 22, after which a battery relay is turned on in a step 23 to charge the battery. If the battery voltage VB becomes higher than 14 V, for example, then the battery relay is turned off in a step 25 to stop charging the battery.

If $V > VB$ in the step 21, then the battery voltage VB is measured in a step 42, which is followed by a step 43 which determines whether the battery voltage VB is lower than 12 V, for example, or not. If the battery voltage VB is lower than 12 V, then the duty factor of the power converter 4 for increasing the charged voltage is determined in a step 44 to increase the generated voltage V higher than the battery voltage VB. The battery relay is turned on in a step 45 to charge the battery. If the battery voltage VB is higher than 12 V in the step 43, the duty factor for the charging voltage of 12 V is determined to charge the battery in steps 46, 47.

If $Ba_2 < Ba_1$ in each of the steps 12, 31, it means that the boost pressure $Ba_1$ before the electric rotary machine is driven through the inverter is higher than the boost pressure $Ba_2$ after the electric rotary machine is driven, and this condition may be caused by either releasing the accelerator pedal immediately after it has been depressed or a malfunction of the controlling device. Therefore, a processing from steps 38 through 41 confirms if the accelerator pedal is quickly returned or the control unit fails. When this happens, the inverter is inactivated. More specifically, the count N of a counter is determined in a step 38, and the counter count N and a prescribed count $N_1$ are compared in a step 39. If $N < N_1$, this means that the accelerator pedal which has been depressed is suddenly released. Thus, control returns to the step 1 to repeat the aforesaid control cycle. If $N > N_1$, this means that even upon elapse of a certain period of time after the electric rotary machine is driven, the boost pressure does not rise. The failure of the controlling device is announced by a buzzer or a lamp in a step 40, and the operation of the rotary machine by the inverter is stopped in a step 41.

With the present invention, as described above, the boost pressure of the turbocharger is checked at all times to achieve an optimum boost pressure which is required for quick acceleration dependent on the depth to which the accelerator pedal is depressed, which is the intention of the driver of the motor vehicle incorporating the turbocharger. Therefore, the response of the engine is increased, making it possible to drive the motor vehicle through quick maneuvering efforts.

Furthermore, it is determined whether the boost pressure required by the engine according to the amount of depression of the accelerator pedal is in excess of the boost pressure generated from the turbocharger only by the energy of exhaust gases emitted from the engine. When an appropriate increase in the low-speed torque is required, the electric rotary machine is supplied with electric power to increase the boost pressure developed by the turbocharger for thereby producing a low-speed torque corresponding to the driver's intention.

Although a certain preferred embodiment has been shown and described, it should be understood that many changes and modifications may be made therein without departing from the scope of the appended claims.

What is claimed is:

1. A device for controlling a turbocharger with an electric rotary machine, comprising:
   a turbine mounted on an engine on a motor vehicle and drivable by exhaust gases emitted from the engine;
   a rotatable shaft coupled to said turbine;
   a compressor coupled to said rotatable shaft for delivering air under pressure to said engine;
   an electric rotary machine coupled to said rotatable shaft;
   an engine speed sensor for detecting the rotational speed of the engine;
   an accelerator pedal movement sensor for detecting the amount of depression of an accelerator pedal which controls operation of said engine;
   a boost pressure sensor for detecting the pressure of air supplied to said engine;
   a turbine speed sensor for detecting the rotational speed of said turbine;
   a battery mounted on said motor vehicle;
   means for calculating a required boost pressure based on signals from said engine speed sensor and said accelerator pedal movement sensor;
   means for comparing said required boost pressure and a boost pressure generated from the turbocharger by the energy of exhaust gases emitted from the engine and corresponding to the rotational speed of the engine; and
   means for driving said electric rotary machine as a motor and supplying said electric rotary machine with electric power from said battery which corresponds to the difference between said required boost pressure and said boost pressure generated by the turbocharger if said required boost pressure is higher than said boost pressure generated by said turbocharger,
wherein said means for driving and supplying said electric rotary machine includes means for adding electric power corresponding to the rotational speed of the turbine based on a signal from said turbine speed sensor and electric power having a value produced by subtracting the boost pressure, to calculate electric power which is required to be supplied to said electric rotary machine.

2. A device according to claim 1, wherein said means for driving and supplying said electric rotary machine includes means for adding electric power corresponding to the rotational speed of the turbine based on a signal from said turbine speed sensor and electric power having a value produced by subtracting said boost pressure produced by said turbocharger from said required boost pressure, to calculate corrected electric power which is required to be supplied to said electric rotary machine, if the boost pressure detected by said boost pressure sensor after said electric rotary machine has been operated as a motor is higher than the boost pressure detected by said boost pressure sensor before said electric rotary machine is operated as a motor.

3. A device according to claim 2, wherein said means for driving and supplying said electric rotary machine includes power regulating means for reducing electric power to be supplied to said electric rotary machine by a prescribed amount if the boost pressure detected by said boost pressure sensor after said electric rotary machine has been operated as a motor is higher than said required boost pressure.

4. A device for controlling a turbocharger with an electric rotary machine, comprising:
   a turbine mounted on an engine on a motor vehicle and drivable by exhaust gases emitted from the engine;
   a rotatable shaft coupled to said turbine;
   a compressor coupled to said rotatable shaft for delivering air under pressure to said engine;
   an electric rotary machine coupled to said rotatable shaft;
   an engine speed sensor for detecting the rotational speed of the engine;
   an accelerator pedal movement sensor for detecting the amount of depression of an accelerator pedal which controls operation of said engine;
   a boost pressure sensor for detecting the pressure of air supplied to said engine;
   a battery mounted on said motor vehicle;
   means for calculating a required boost pressure based on signals from said engine speed sensor and said accelerator pedal movement sensor;
   means for comparing said required boost pressure and a boost pressure generated from the turbocharger by the energy of exhaust gases emitted from the engine and corresponding to the rotational speed of the engine;
   means for driving said electric rotary machine as a motor and supplying said electric rotary machine with electric power from said battery which corresponds to the difference between said required boost pressure and said boost pressure generated by the turbocharger if said required boost pressure is higher than said boost pressure generated by said turbocharger; and
   means for comparing the boost pressure after said electric rotary machine has been operated as a motor and the boost pressure before said electric rotary machine is operated as a motor, after the electric rotary machine has been operated as a motor and for generating a warning signal if the boost pressure after said electric rotary machine has been operated as a motor is lower than the boost pressure before said electric rotary machine is operated as a motor.

5. A device for controlling a turbocharger with an electric rotary machine, comprising:
   a turbine mounted on an engine on a motor vehicle and drivable by exhaust gases emitted from the engine;
   a rotatable shaft coupled to said turbine;
   a compressor coupled to said rotatable shaft for delivering air under pressure to said engine;
   an electric rotary machine coupled to said rotatable shaft;
   an engine speed sensor for detecting the rotational speed of the engine;
   an accelerator pedal movement sensor for detecting the amount of depression of an accelerator pedal which controls operation of said engine;
   a boost pressure sensor for detecting the pressure of air supplied to said engine;
   a battery mounted on said motor vehicle;
   means for calculating a required boost pressure based on signals from said engine speed sensor and said accelerator pedal movement sensor;
   means for comparing said required boost pressure and a boost pressure generated from the turbocharger by the energy of exhaust gases emitted from the engine and corresponding to the rotational speed of the engine;
   means for driving said electric rotary machine as a motor and supplying said electric rotary machine with electric power from said battery which corresponds to the difference between said required boost pressure and said boost pressure generated by the turbocharger if said required boost pressure is higher than said boost pressure generated by said turbocharger; and
   means for comparing the boost pressure after said electric rotary machine has been operated as a motor and the boost pressure before said electric rotary machine is operated as a motor, after the electric rotary machine has been operated as a motor, and for stopping the operation of said electric rotary machine as a motor if the boost pressure after said electric rotary machine has been operated as a motor is lower than the boost pressure before said electric rotary machine is operated as a motor.

* * * * *